United States Patent [19]

Shikano et al.

[11] 4,453,185
[45] Jun. 5, 1984

[54] AUTOMATIC DIAPHRAGM CONTROL DEVICE FOR A CLOSED CIRCUIT TELEVISION CAMERA

[75] Inventors: Tohru Shikano; Terumi Ogasawara, both of Tokyo, Japan

[73] Assignee: Asahi Seimitsu Kabushiki Kaisha, Tokyo, Japan

[21] Appl. No.: 365,046

[22] Filed: Apr. 2, 1982

[30] Foreign Application Priority Data

Sep. 22, 1981 [JP] Japan .................................. 56-149815

[51] Int. Cl.³ ............................................ H04N 5/26
[52] U.S. Cl. ................................................. 358/228
[58] Field of Search .......................................... 358/228

[56] References Cited

U.S. PATENT DOCUMENTS 4,050,085 9/1977 Prince et al. ......................... 358/228

Primary Examiner—Richard Murray
Attorney, Agent, or Firm—Birch, Stewart, Kolasch & Birch

[57] ABSTRACT

A diaphragm control for a video camera is disclosed and controls the camera diaphragm in response to the camera video output. The camera video output signal is adjustably weighted to vary the value of the dark portions of signal with respect to the light portions through the use of a selective polarity invertible amplifier which holds the average signal strength constant as the weight of the light and dark portions is varied. The output of the polarity invertible amplifier is averaged and then compared with a reference intensity signal. The output of the comparator is used to control the camera diaphragm.

12 Claims, 15 Drawing Figures (a) $V_{IN}$ (b) $V_{PI}$
$\begin{pmatrix} VR_1 = \infty \text{ or} \\ SW : OFF \end{pmatrix}$ (c) $V_{PI}$
$\begin{pmatrix} VR_1 = 0 \text{ or} \\ SW : ON \end{pmatrix}$

2

AUTOMATIC DIAPHRAGM CONTROL DEVICE FOR A CLOSED CIRCUIT TELEVISION CAMERA

FIELD OF THE INVENTION

The present invention relates to an automatic diaphragm control device for acting as a metering system for a closed circuit television camera utilizing a video output signal from the television camera.

BACKGROUND OF THE INVENTION

Automatic diaphragm control according to the teachings of the present invention uses a DC voltage obtained from rectification of the video output signal as a control signal to form the optimum picture. A rectifier used to detect the light intensity of the object for pickup is the most important element of the control, since the light measuring mode of the control is determined by this rectifier.

In addition to the absolute brightness of the light intensity of the object for pickup, the ratio between the brightest portion of the object to be monitored by the video signal and the darkest portion of the object known as the contrast ratio of this object, is also one of the important factors which must be considered in order to obtain the optimum picture. In the natural world, the contrast ratio reaches a level as high as 10 to 1 even under a cloudy sky and often reaches 100 to 1 under a blue sky. In the television-reproduced picture, on the contrary, the contrast ratio is limited to an order of 30 or 40 to 1. Accordingly, it must be decided whether the bright portion or the dark portion should be used as the main object to be monitored for the measurement of light intensity when an object, in general, simultaneously contains both the bright portion and the dark portion, since it would be impossible to accurately measure or reproduce both portions at once.

Theoretically, the light measuring mode most suitable for the case where the darkest portion of the object is to be light-measured may be referred to as the average light measuring mode while the light measuring mode most suitable for the case where the brightest portion of the object to be monitored is light-measured may be referred to as the peak light measuring mode. As both light measuring modes rely upon the video output signal from the television camera for diaphragm control, the two types of light measuring modes as mentioned above have already been proposed. However, both of these well known modes still have problems. Specifically, when the same object to be reproduced as a video signal simultaneously contains both the brightest portion and the darkest portion as previously mentioned, the average light measuring mode will often make the bright portion a white solid portion without a contrast gradient while the peak light measuring mode will often make the darkest portion, which should be normally discriminable by the camera, indiscriminable.

SUMMARY OF THE INVENTION

Accordingly, it is an object of the invention to produce an improved automatic diaphragm control device for a closed circuit television camera.

It is another object of the present invention to produce an automatic diaphragm control circuit for closed circuit television cameras wherein the weighting of light and dark portions of the picture being monitored may be controlled.

It is a further object of the present invention to produce an automatic diaphragm control circuit for closed circuit television cameras wherein the weighting of light and dark portions is performed in part by a polarity-invertible amplifier circuit.

It is still a further object of the present invention to produce an automatic diaphragm control circuit for closed circuit television cameras wherein a compromise measurement mode useful in relatively high contrast environments may be utilized.

In consideration of the fact that the light measuring mode relying upon the video output signal from the television camera is delicately influenced not only by the contrast ratio between the bright portion and the dark portion as previously mentioned but also by other factors such as the area ratios of these portions to the overall picture, the objects of the present invention are fulfilled by a novel arrangement permitting the changeover of the light measuring modes even in a state of high contrast such as in the natural world without a remarkable change in the reference level of the video output signal.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

The present invention will be now described more in detail with respect to embodiments shown by the accompanying drawing.

Figure 1:
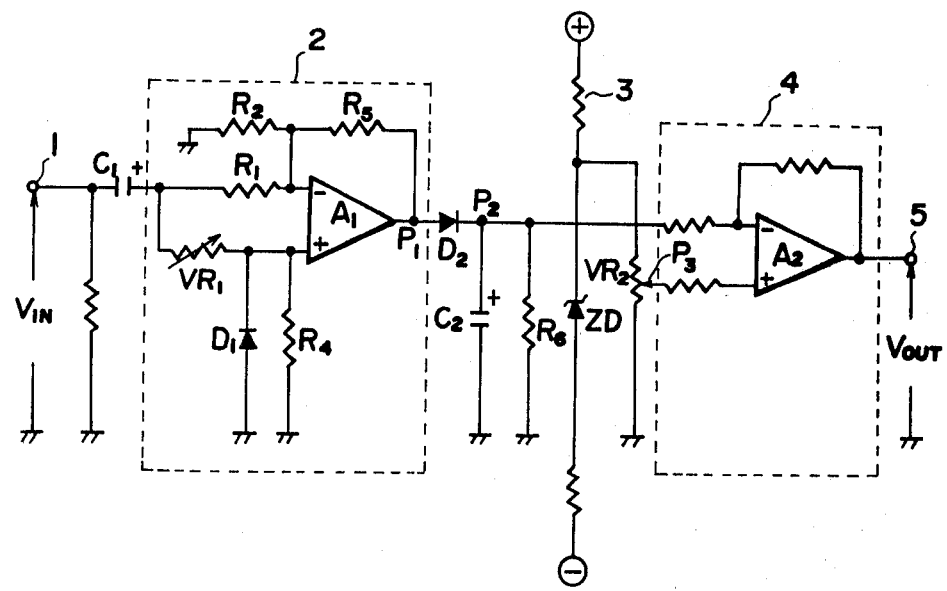
FIGS. 1 through 6 are circuit diagrams illustrating embodiments of the present invention, respectively.

FIG. 1 is a circuit diagram schematically illustrating an embodiment of the present invention, in which reference numeral 1 designates an input terminal for receiving an input signal $V_{IN}$ corresponding to a video output signal from a television camera. This input terminal 1 is connected via a capacitor $C_1$ to a polarity-invertible amplifier 2 including an operational amplifier $A_1$ so that an amplified inverted signal $VP_1$ free from a DC component may be obtained at its output terminal $P_1$. In the polarity-invertible amplifier 2, the capacitor C₁ is connected via a resistance R₁ to a ground terminal, on one side, and via a variable resistance VR₁ to a positive input terminal of the operational amplifier A₁, on the other side, while said ground terminal is connected via resistances R₂ and R₅ to the output terminal P₁ by connecting a grounded resistance R₂ between said resistance R₅ and the negative input terminal of the operational amplifier A₁. The signal VP₁ from the polarity-invertible amplifier 2 is applied to a diode D₂ to thereby rectify the signal VP₁ and a DC voltage VP₂ is obtained at its output terminal P₂. The DC voltage VP₂ at said output terminal P₂ is compared in a comparator 4 including an operational amplifier A₂ with a reference voltage VP₃ from a separately provided reference voltage circuit 3, an output terminal 5 of said comparator 4 providing a diaphragm control signal $V_{out}$ according to a result of such comparison. A smoothing capacitor C₂ and a resistance R₆ are connected between the output terminal P₂ and the ground, and said reference voltage circuit 3 is so arranged that a voltage stabilized by a Zener diode ZD is applied via a variable resistance VR₂ for regulation of the reference voltage to a point P₃ as the reference voltage VP₃.

Figure 8:
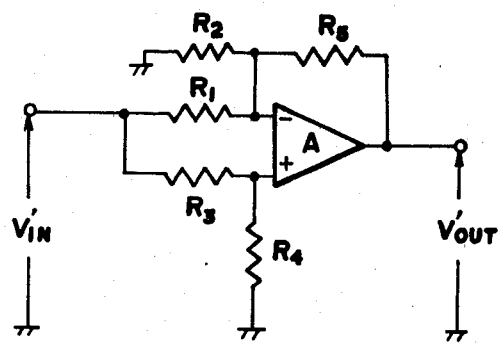
FIG. 8 is a schematic circuit diagram illustrating a principle upon which the operation of polarity-invertible amplifier according to the present invention is based.

The polarity-invertible amplifier 2 is arranged so that the polarity changeover is achieved by the variable resistance VR₁. FIG. 8 shows how the polarity changeover is effected. In connection with FIG. 8, a relationship between the input voltage $V'_{IN}$ and the output voltage $V'_{out}$ is expressed by a following formula (1):

$$V'_{out} = \left\{ \frac{R_4}{R_3 + R_4}\left(1 + \frac{R_5}{R_1} + \frac{R_5}{R_2}\right) + \frac{R_5}{R_2} \right\} V'_{IN} \quad (1)$$

Selection of appropriate values for R₃ in this formula (1) results in the corresponding values for $V'_{out}$ as set forth in Table 1:

TABLE 1

| R₃ [KΩ] | $V'_{out}$ [V] |
|---|---|
| ∞ | $-(R_5/R_1) \cdot V'_{IN}$ |
| R₁·R₄/(R₂//R₅) | 0 |
| 0 | $(1 + R_5/R_2) \cdot V'_{IN}$ |

It will be seen from Table 1 that an output of a polarity opposite to that of the input is obtained when R₃=0. Such amplifier is also characterized in that the output is 0 independently of the input when R₃=R₁·R₄(R₂//R₅). Accordingly, the embodiment of FIG. 1 employing the polarity-invertible amplifier 2 is realized when said resistance R₃ is replaced by the variable resistance VR₁. It is assumed here that a signal of the waveform $V_{IN}$ as shown by FIG. 9(a) is received as the input signal.

When the variable resistance VR₁ then has a value of ∞, a polarity inverted signal VP₁ as shown by FIG. 9(B) (VR₁=∞) appears at the point P₁ and when said resistance VR₁ has a value of 0, a signal VP₁ of the same polarity as the input signal, as shown by FIG. 9(c) (VR₁=0) appears at the point P₁. Each of these signals contains no DC component, namely, is stabilized in a constant state in which a positive area is equal to a negative area.

Consequently, in the case of VR₁=∞, the base line 0—0 certainly displaces as the amplitude varies, so long as the bright portion is relatively broad, but the influence of amplitude variation becomes slight as an area of said bright portion is reduced. This corresponds to the so-called average light measuring mode in which the DC voltage (VP₂) at the point P₂ already rectified is maintained constant. Thus, in the case of such average light measuring mode (VR₁=∞), the DC voltage VP₂ is determined by an overall average result and a relatively dark portion of the picture serves as the main object to be light-measured, since, as previously mentioned, the bright portion would have no contrast gradient and would result in a white solid picture if the bright portion of reduced area is selected as the main object to be light-measured.

In the case of VR₁=0, on the contrary, the video signal component continues to be rectified even after the area of the bright portion has sufficiently been reduced and the base line has already been stabilized. This corresponds to the so-called peak light measuring mode in which any amplitude variation is detectable and, in such case (VR₁=0), as previously mentioned, a relatively bright portion serves as the main object to be light-measured.

Figure 2:
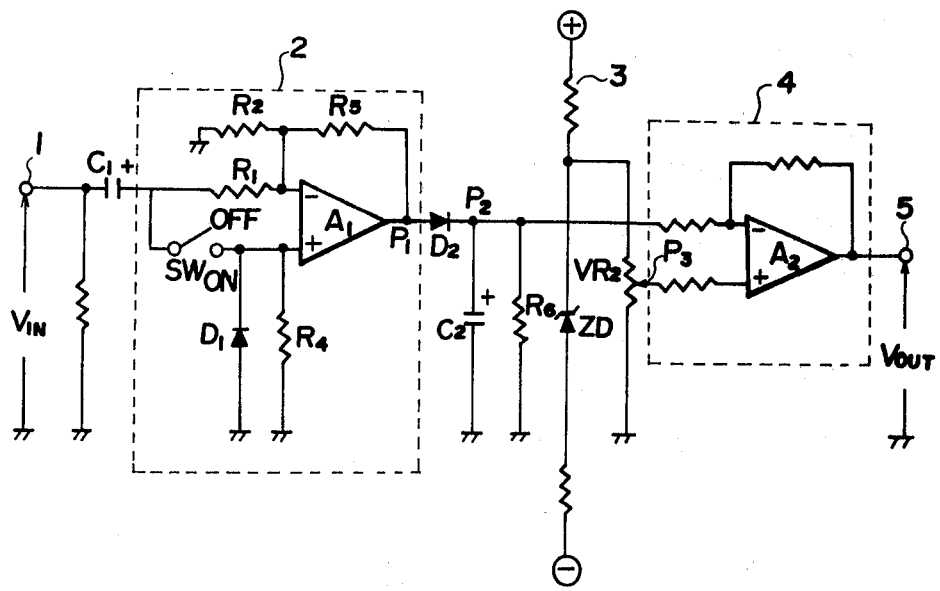
Figure 3:
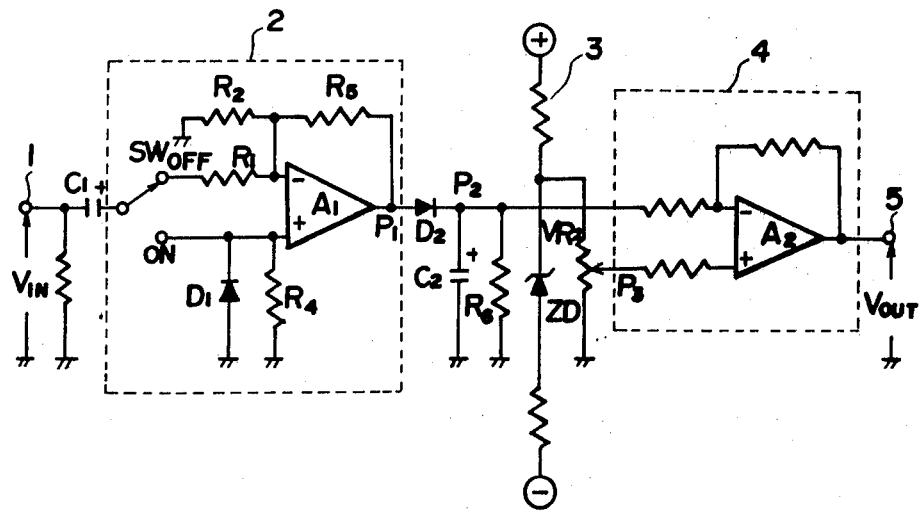

FIGS. 2 and 3 show another embodiment of the present invention in which the variable resistance VR₁ used in the previous embodiment of FIG. 1 is replaced by a switch SW of which the OFF-state corresponds to the state of VR₁=∞ or the average light measuring mode and the ON-state corresponds to the state of VR₁=0 or the peak light measuring mode. It should be understood here that the polarity changeover of the polarity-invertible amplifier 2 is possible also when the variable resistance VR₁ is thus replaced by the switch SW. The ON-state of the switch SW as shown in FIG. 3 corresponds to the case of R₃=0, R₁=∞ in the formula (1), establishing the relation $V'_{out}=(1+R_5/R_2) \cdot V'_{IN}$ for R₃=0 as set forth in Table 1.

Figure 4:
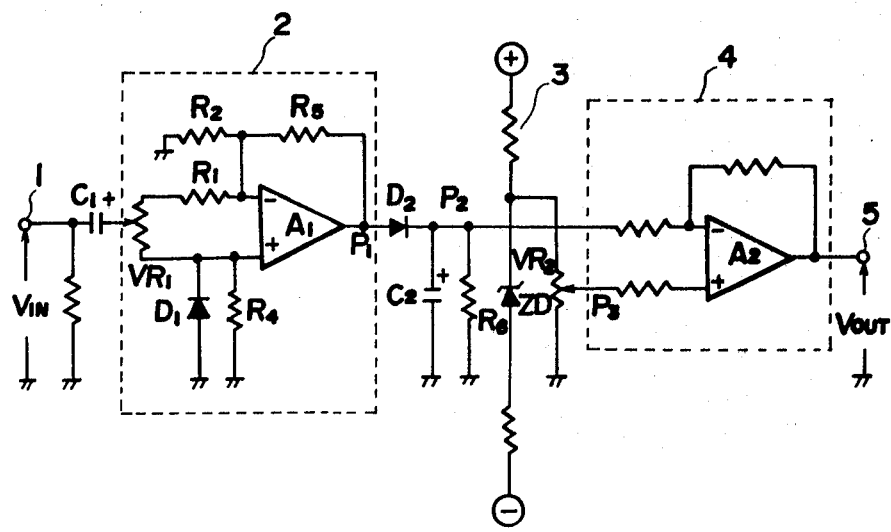

FIG. 4 illustrates further another embodiment of the present invention substantially corresponding to the embodiment of FIG. 1 modified so that the resistance R₁, when inserted in connection with the minus terminal of the operational amplifier A₁, is variable in operative association with the variable resistance VR₁. In this embodiment, the state of VR₁=∞ in the connection to the plus terminal of the operational amplifier A₁ results in VR₁=0 along the connection to the minus terminal of said amplifier A₁, providing the average light measuring mode while the state of VR₁=0 along the connection to said plus terminal results in VR₁=∞ along the connection to said minus terminal, providing the peak light measuring mode. With respect to the intermediate point corresponding to $V'_{out}=0$, the situation is the same as in the embodiment of FIG. 1.

Figure 5:
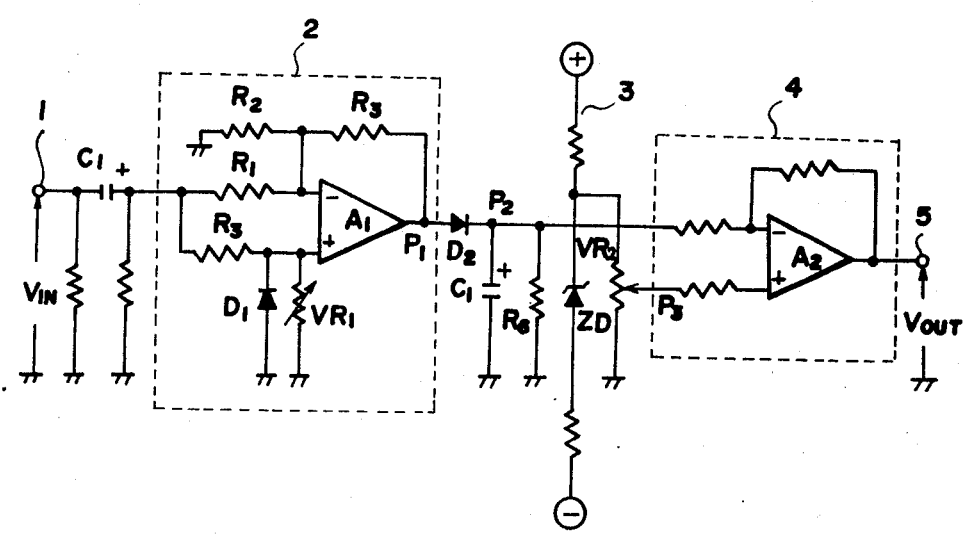
Figure 6:
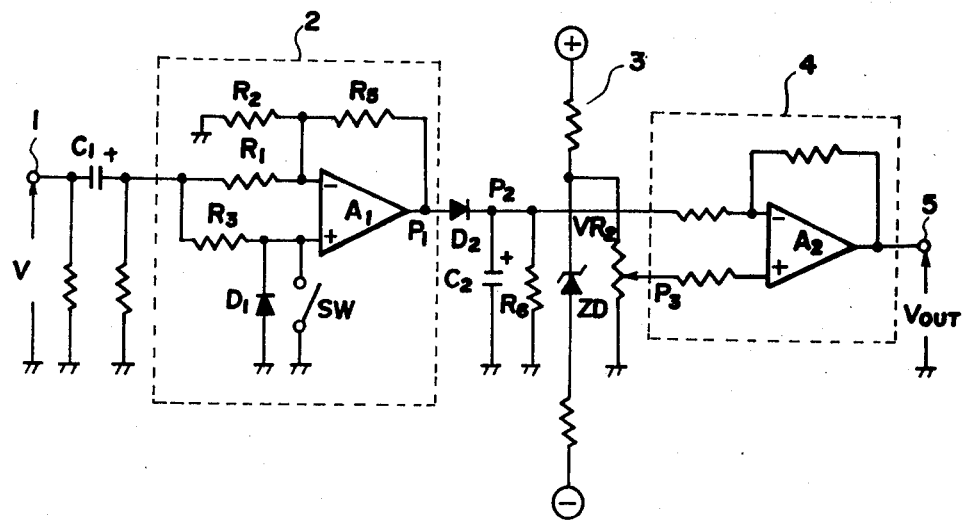

FIGS. 5 and 6 illustrate still two other embodiments of the present invention, in which the resistance R₄ used in the previous embodiments and appearing the the formula (1) is variable and a relation between R₄ and $V'_{out}$ is provided as set forth in Table 2:

TABLE 2

| R₄ [KΩ] | $V'_{out}$ [V] |
|---|---|
| 0 (ON) | $-(R_5/R_1) \cdot V'_{IN}$ |
| (R₂//R₅)R₃/R₁ | 0 |
| ∞ (OFF) | $(1 + R_5/R_2) \cdot V'_{IN}$ |

The embodiment of FIG. 5 has a variable resistance VR₁ replacing the resistance R₄ and the embodiment of FIG. 6 has a switch SW replacing said resistance R₄. With these embodiments, an output of the polarity opposite to that of the input is obtained when VR₁=0 (SW: ON) and an output of the same polarity as the input is obtained when $VR_1 = \infty$ (SW: OFF), as will be obviously understood from Table 2. Furthermore, Table 2 indicates that the state of $VR_1 = (R_2//R_5) \cdot R_3/R_1$ results in an output of 0 independently of the input. The state of $VR_1 = 0$ (SW: ON) provides the average light measuring mode while the state of $VR_1 = \infty$ (SW: OFF) provides the peak light measuring mode.

Figure 10:
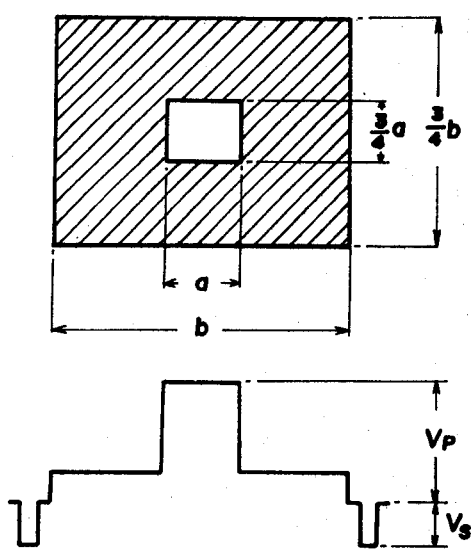
FIG. 10 is a diagram illustrating the relationship between the object for pickup and the video output signal corresponding thereto.
Figure 11A:
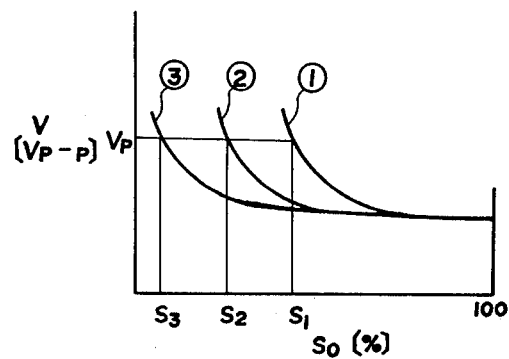
FIG. 11a is a diagram illustrating the relationship between the average light and contrast in the average light measurement mode.
Figure 11B:
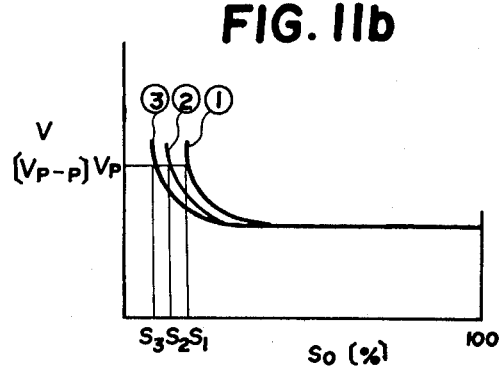
FIG. 11b is a diagram illustrating the relationship between peak light and contrast in the peak light measuring mode.

FIG. 10 illustrates a special object to be monitored and reproduced which is used as a test object to examine the effects of the respective light measuring modes together with a waveform of the object's corresponding video output signal. FIGS. 11a and 11b show curves characterizing possible relationships between the video output signal ($V_{IN}$) and the area ratio ($S_o$). The term "area ratio ($S_o$)" used herein corresponds to the area of signal waveform as previously mentioned and, more specifically, to a ratio of the bright portion in the overall picture, as expressed by the formula:

$$S_o = \left(\frac{a}{b}\right)^2 \times 100[\%]$$

where a is the size of the bright area; and b is the overall picture size.

It will be obvious from FIGS. 11a and 11b how the characteristic curves of these figures vary depending upon the contrast. FIG. 11a relates to the case of average light measuring mode while FIG. 11b relates to the case of peak light measuring mode. In FIGS. 11a and 11b, reference numeral (1) indicates a case of high contrast, (3) indicates a case of low contrast and (2) indicates a case of intermediate contrast relative to the previous two cases (1) and (3). It will be seen from these figures that the average light measuring mode is remarkably influenced by the contrast ratio while the peak light measuring mode is only slightly influenced by the contrast ratio. It will also be seen that, in the case (3) of low contrast, the characteristic curves both extend over a range beginning from a point corresponding to the smallest value ($S_3$) of the area ratio ($S_o$) relative to the video output signal ($V_{IN}$) which usually serves as a reference for the selection of the appropriate mode both in the case of average light measuring mode and in the case of peak light measuring mode, so that both the modes can be utilized over a considerably large coextensive range as far as the case of low contrast is concerned.

Figure 12:
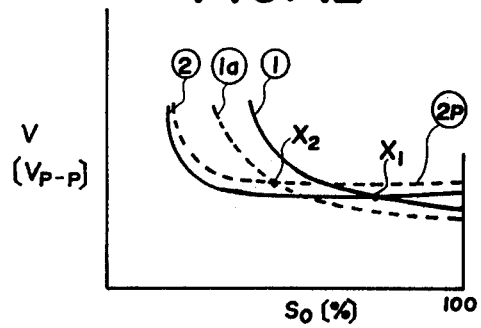
FIG. 12 is a diagram illustrating differences between the two light measuring modes for an object of high contrast and its light measuring characteristics as a function of variations in the output voltage level.

FIG. 12 shows curves characterizing the respective light measuring modes in the case of high contrast, in which the characteristic curve (1) corresponds to the average light measuring mode while the characteristic curve (2) corresponds to the peak light measuring mode. The respective video output signals are shown as deviating from each other at the position corresponding to the area ratio of 100% because the reference level of the video output signal has been selected using the Test Chart prepared according to the standard of Electronics Industries Association of Japan (EIAJ). Certainly this EIAJ Test Chart has more or less contrast, but the area ratio of 100% represents, as previously mentioned, the state in which overall the picture is evenly bright with the contrast equal to 0 so that the average light measuring mode presents a video output signal level lower than the peak light measuring mode at the area ratio of 100%.

As already mentioned, the average light measuring mode is largely influenced by the contrast and, when an object of high contrast as often occurs within the natural world is measured after the reference level has been set on the basis of an object of low contrast such as said EIAJ Test Chart, there is measured and reproduced an excessive quantity of light or so-called white solid phenomenon since this mode is substantially free from influence of the contrast.

These phenomena are purely theoretical and, therefore, every inconvenience which might possibly occur due to either of these phenomenons may be overcome by readjusting, case by case, the reference level. However, it is very troublesome to make such readjustment each time the polarity changeover of the light measuring mode takes place.

Such inconveniences may be overcome, according to the teachings of the present invention, by a circuit arrangement having in the inverted state a degree of amplification somewhat higher than in the non-inverted state so that the reference level of video output signal may rise enough to moderate the peak output upon changeover from the average light measuring mode to the peak light measuring mode but drop enough to moderate the average upon changeover in the opposite direction back into the average light measuring mode and thereby the reference level of the video output signal may be maintained constant even when the changeover between light measuring modes takes place under a condition of high contrast as that which usually occurs within the natural world.

A condition necessary for the satisfactory measurement and reproduction of an object is to provide a reference level of the video output signal which is maintained constant and corresponds to the area ratio such as that represented in FIG. 12 by a point $X_1$ (referred to hereinafter as cross point) at which the average light measuring curve ①  and the peak light measuring curve ②  intersect each other. In other words, the reference level of video output signal does not change even if the conditions of the object for measurement change. Accordingly, the level should be set at a cross point $X_2$ (intersecting point of two broken lines ①a and ②P ) rather than at said cross point $X_1$ (intersection point of two solid lines ①  and ② ) since here the signal level exhibits no change even after changeover of the light measuring mode under the condition of high contrast.

The present invention is also characterized in that the previously mentioned cross points can be shifted as desired. Such shifts are possible when the resistance $R_5$ in FIG. 8 is replaced by a variable resistance and also possible when the resistance $R_3$ and $R_4$ corresponding to the variable resistance for changeover of the light measuring mode is selected within a range indicated by Table 3 as will be discussed later.

Both when the resistance corresponding to the resistance $R_3$ in FIGS. 2 and 3 is replaced by a switch SW and when the resistance $R_5$ is replaced by a variable resistance, it is possible to shift the cross points as desired by setting the output level in the average light measuring mode which is low as represented by 1a and the output level in the peak measuring mode which is high as represented by 2P in FIG. 12. In the cases of FIGS. 1, 4 and 5 in which the variable resistance $VR_1$ is employed in the place of the resistance $R_3$ or $R_4$, it is possible to vary the output levels in the average light measuring mode and the peak light measuring mode by selecting the value of this variable resistance within a range indicated in Table 3. A substantially improved effect is thus obtained in practice by a combination of two remarkable possibilities, namely, by changing the light measuring mode while shifting said cross points.

TABLE 3

| Light measuring mode | $R_3$ [KΩ] | $R_4$ [KΩ] |
|---|---|---|
| Average | $\infty > R_3 > R_1 \cdot R_4/(R_2//R_5)$ | $0 < R_4 < (R_2//R_5)R_3/R_1$ |
| Peak | $0 < R_3 < R_1 \cdot R_4/(R_2//R_5)$ | $\infty > R_4 > (R_2//R_5)R_3/R_1$ |

Figure 7:
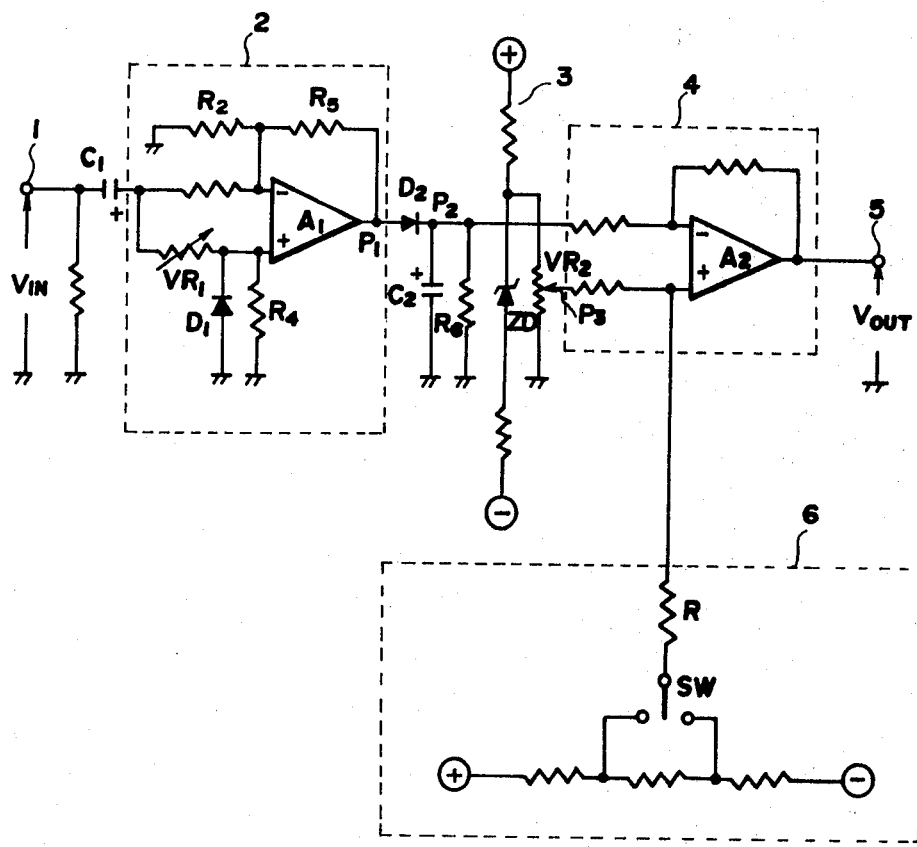
FIG. 7 is a circuit diagram illustrating another embodiment of the present invention.

According to the present invention, it is also possible to obtain the output $V'_{out}=0$ independently of the input $V'_{IN}$ so that the diaphragm may be remote-controlled at the user's discretion independently of the video output signal level in the particular state. FIG. 7 illustrates an embodiment of the arrangement for such remote control, in which an outgoing line extends via a resistance R from the plus terminal of the operational amplifier $A_2$ so that a voltage from a remote control circuit 6 to said outgoing line is switched by a switch or a variable resistance and thereby the diaphragm may be remote controlled. The automatic mode may be changed from peak to average or anywhere in between, if desired by the user.

The present invention is also characterized in that the input signal can be thus cut off without cutting off the line for supply of the video output signal from the television camera.

In the circuit arrangement for execution of the present invention, the resistance corresponding to the resistance $R_2$ in FIG. 8 may be omitted so far as the case is concerned, in which the polarity-invertible amplifier 2 must not have a particularly high degree of amplification, and in this case a relationship between the input voltage $V'_{IN}$ and the output voltage $V'_{out}$ is given by the following expression:

$$V'_{out} = \left\{ \frac{R_4}{R_3 + R_4}\left(1 + \frac{R_5}{R_1}\right) - \frac{R_5}{R_1} \right\} V'_{IN} \quad (2)$$

Appropriate selection of $R_3$ or $R_4$ in this formula provides $V'_{out}$ as set forth in Table 4.

TABLE 4

| $R_3$ [KΩ] | $R_4$ [KΩ] | $V'_{out}$ [V] |
|---|---|---|
| ∞ (OFF) | 0 (ON) | $-(R_5/R_1)V'_{IN}$ |
| $R_1 \cdot R_4/R_5$ | $R_3 \cdot R_5/R_1$ | 0 |
| 0 (ON) | ∞ (OFF) | $V'_{IN}$ |

The diode $D_1$ interposed between the plus terminal of the polarity-invertible amplifier $A_1$ and the ground in the circuit arrangement according to the present invention serves to prevent a reduction in the precision of the diaphragm control when in the non-inverted state for an object of low contrast.

Figure 9:
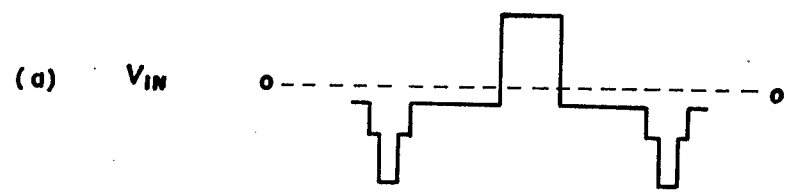
FIGS. 9a–c are diagrams illustrating a relationship between the video output signal waveform and the output waveform of the polarity-invertible amplifier.
Figure 9:
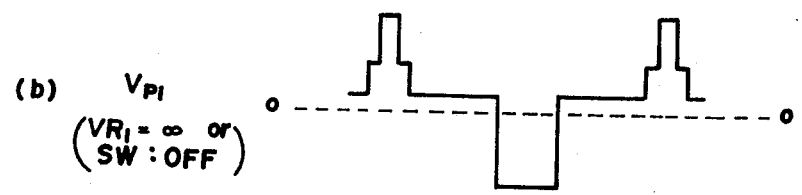
Figure 9:
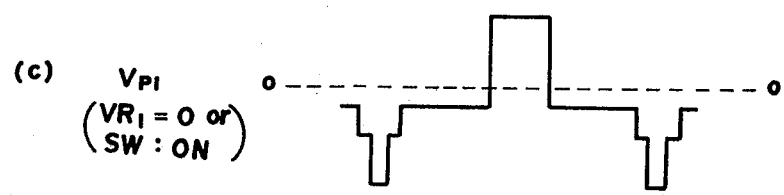

This aspect will be considered in reference with FIG. 9. As previously described, the input signal $V_{IN}$ is so related to the signal $VP_1$ appearing at the point $P_1$, in FIG. 9, that the positive area is always equal to the negative area. Accordingly, a change in the quantity of light measured off an object having no contrast can be reflected in the DC voltage $VP_2$ appearing at the point $P_2$ if the voltage has its polarity inverted at the point $P_1$ and the voltage thus polarity inverted has been then rectified into said DC voltage $VP_2$, but such change in the quantity of light could not be satisfactorily reflected in the non-inverted state. However, insertion of the diode $D_1$ permits a change of the input signal $V_{IN}$ to be sufficiently reflected in the DC voltage $VP_2$ when also in the non-inverted state, since the diode $D_1$ is turned ON with a minus portion of the input signal $V_{IN}$, causing the capacitor $C_1$ to be charged, and then the diode $D_1$ is turned OFF again with a plus portion of the signal so that this plus portion of the signal is added to the voltage previously charged and thereby a DC restoration is achieved.

When the video output signal from the camera reaches a saturated condition due to excessive quantity of light, the DC voltage $VP_2$ appearing at the point $P_2$ should be normally higher than the reference voltage $VP_3$ appearing at the point $P_3$. Due to the waveform control by the camera, the latter often becomes higher than the former and makes the diaphragm control impossible. However, such pehnomenon may be effectively avoided by DC restoration which is achieved through the diode $D_1$ and the capacitor $C_1$.

DC restoration occurring in the inverted state makes it impossible for the output signal to reflect a change in the quantity of light, as opposed to the case of non-inverted state. However, in the circuit arrangement according to the present invention, such DC restoration has a substantially advantageous effect in the non-inverted state but practically no influence in the inverted state.

Obviously, it is also possible to arrange the device according to the present invention so that the variable resistance or the switch serving to effect polarity changeover of the polarity-invertible amplifier and thereby to effect changeover between the average light measuring mode and the peak light measuring mode may be remote-controlled by means of any method known in the art. Other modifications of the present invention will also be obvious to those of ordinary skill in the art. Such modifications are within the spirit and scope of the present invention as claimed in the appended claims.

We claim:

1. A diaphragm control for a video camera producing a video output signal having bright signal portions and dark signal portions representative of bright and dark areas of the area monitored by said video camera, respectively, said control comprising:

input means for receiving said video output signal;
   means for adjustably weighting said video output signal to vary the weight of said bright signal portions with respect to said dark signal portions while holding the average strength of said video output signal constant, said means for adjustably weighting producing a weighted signal and including,
   selective polarity invertible amplifier means for selectively varying the amplitude of said video output signal between a predetermined level and its inverse; and
   comparator means for producing a comparator output corresponding to the difference between a separately provided reference signal and the average strength of said weighted signal, said comparator output being used as a control signal for the camera diaphragm.

2. The control of claim 1 further comprising rectification means for converting said weighted signal produced by said means for adjustably weighting into an average DC voltage to be presented to said comparator means.

3. The control of claim 1 wherein said predetermined level is the video output signal level as received by said input means.

4. The control of claim 1 or 2 wherein said means for adjustably weighting includes a switch for selectively shifting said video output signal between a positive input terminal of said amplifier to provide a peak light measurement mode and to a negative input terminal of said amplifier means to produce an average light measuring mode.

5. The control of claim 4 wherein said switch is remotely controlled.

6. The control of claim 1 or 2 wherein said means for adjustably weighting includes a variable resistance connected across a positive input terminal and a negative input terminal of said amplifier means, said variable resistance variably passing said video output signal to said positive and negative input terminals to vary said circuit between a peak light measurement mode and an average light measurement mode, respectively.

7. The control of claim 6 wherein said variable resistance is remotely controlled.

8. The control of claim 1 or 2 wherein said means for adjustably weighting includes a switch connected between a reference voltage and an input terminal of said amplifier means to selectively shunt said terminal, thereby shifting said means for adjustably weighting between a peak light measurement mode and an average light measurement mode.

9. The control of claims 1 or 2 wherein said means for adjustably weighting includes variable resistance means connected between a reference voltage and an input terminal of said amplifier means to variably shunt said terminal thereby varying the weighting of said light signal portions and dark signal portions.

10. The control of claim 1 further comprising reference signal generator means for producing said reference signal representative of desired average signal strength of said output signal.

11. The control of claim 10 wherein said reference signal generator means is remotely controlled.

12. The control of claim 10 or 11 wherein said selective polarity invertible amplifier means selectively adjusts the amplitude of said video output signal to 0 level.

* * * * *